United States Patent
Schnitter et al.

(10) Patent No.: US 9,466,433 B2
(45) Date of Patent: Oct. 11, 2016

(54) VALVE METAL AND VALVE METAL OXIDE AGGLOMERATE POWDERS AND METHOD FOR THE PRODUCTION THEREOF

(71) Applicant: H. C. STARCK GMBH, Goslar (DE)

(72) Inventors: Christoph Schnitter, Holle (DE); Holger Brumm, Goslar (DE)

(73) Assignee: H.C. STARCK GMBH, Goslar (DE)

( * ) Notice: Subject to any disclaimer, the term of this patent is extended or adjusted under 35 U.S.C. 154(b) by 15 days.

(21) Appl. No.: 14/624,590

(22) Filed: Feb. 18, 2015

(65) Prior Publication Data

US 2015/0162137 A1 Jun. 11, 2015

Related U.S. Application Data

(62) Division of application No. 13/119,964, filed as application No. PCT/EP2009/060912 on Aug. 25, 2009, now Pat. No. 8,995,112.

(30) Foreign Application Priority Data

Sep. 23, 2008 (DE) .................. 10 2008 048 614

(51) Int. Cl.
| | |
|---|---|
| *H01G 9/042* | (2006.01) |
| *B22F 1/00* | (2006.01) |
| *B22F 3/11* | (2006.01) |
| *H01G 9/052* | (2006.01) |
| *B22F 3/12* | (2006.01) |
| *B22F 5/00* | (2006.01) |
| *C01G 33/00* | (2006.01) |
| *C22B 34/24* | (2006.01) |

(52) U.S. Cl.
CPC ............ *H01G 9/042* (2013.01); *B22F 1/0096* (2013.01); *B22F 3/1134* (2013.01); *B22F 3/1146* (2013.01); *B22F 3/12* (2013.01); *B22F 5/00* (2013.01); *C01G 33/00* (2013.01); *H01G 9/0525* (2013.01); *B22F 2998/10* (2013.01); *C01P 2006/12* (2013.01); *C01P 2006/40* (2013.01); *C01P 2006/90* (2013.01); *C22B 34/24* (2013.01); *Y10T 29/49002* (2015.01); *Y10T 428/2982* (2015.01)

(58) Field of Classification Search
CPC .. B22F 1/0096; B22F 3/1146; B22F 3/1134; B22F 3/12; B22F 5/00; H01G 9/0525; H01G 9/042; C01G 33/00; Y10T 428/2982
USPC ................ 428/402; 264/618; 419/2, 38; 423/594.17; 75/245
See application file for complete search history.

(56) References Cited

U.S. PATENT DOCUMENTS

| | | | |
|---|---|---|---|
| 7,204,866 B2* | 4/2007 | Oda ............... | B22F 1/0007 361/529 |
| 7,737,066 B2* | 6/2010 | Omori ............. | C01G 33/00 264/681 |
| 8,995,112 B2* | 3/2015 | Schnitter ........ | B22F 1/0096 361/528 |

FOREIGN PATENT DOCUMENTS

WO    WO2006027767    *  3/2006

* cited by examiner

*Primary Examiner* — Leszek Kiliman
(74) *Attorney, Agent, or Firm* — Norman B. Thot

(57) ABSTRACT

A refractory metal compound agglomerate powder having a product of a BET surface area in $m^2/g$ and a sliding coefficient of $\eta$ of 0.33 to 0.95, wherein the refractory metal compound agglomerate powder is selected from niobium agglomerate powder, niobium suboxide agglomerate powder, and tantalum agglomerate powder.

18 Claims, 1 Drawing Sheet

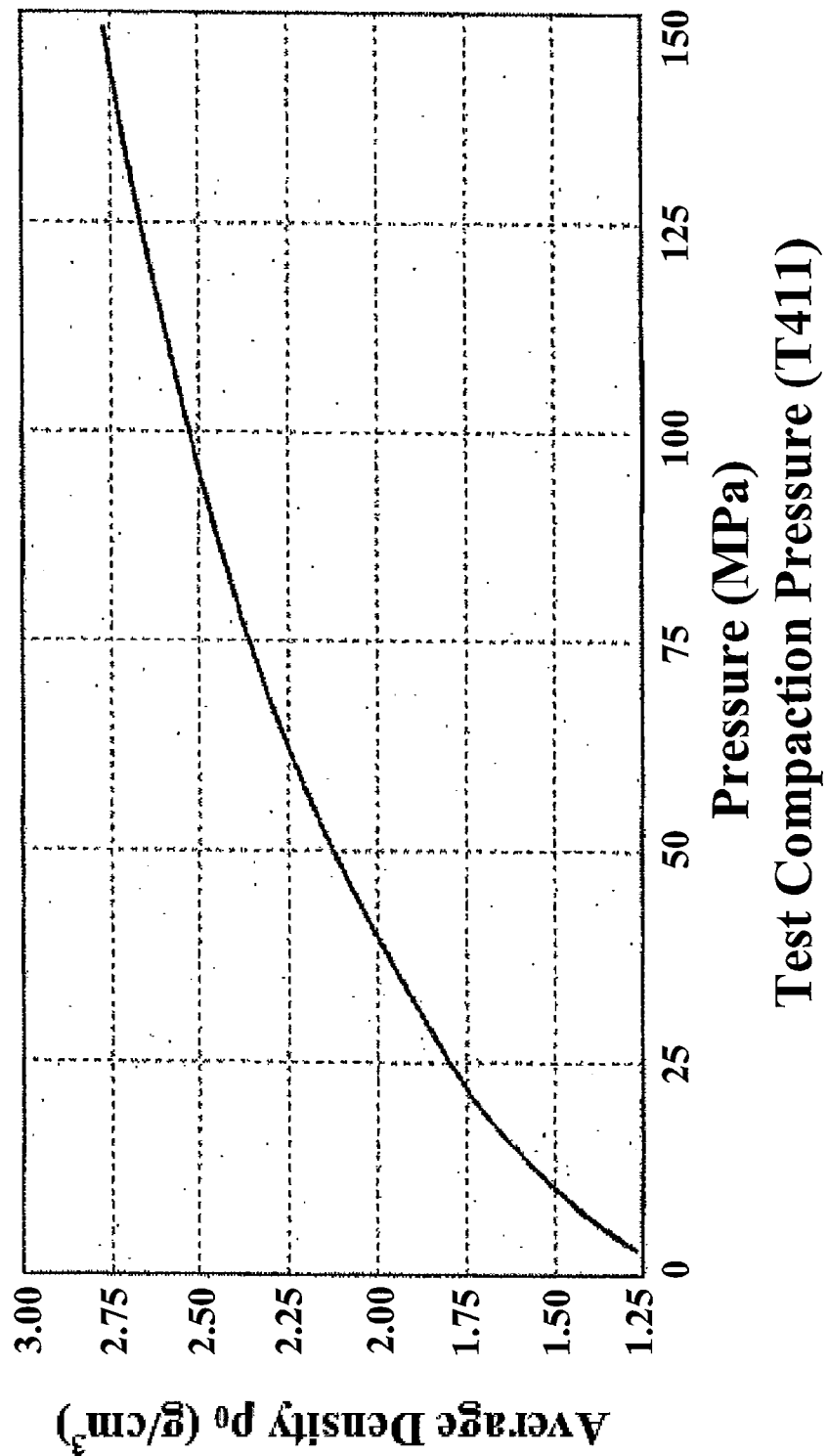

VALVE METAL AND VALVE METAL OXIDE AGGLOMERATE POWDERS AND METHOD FOR THE PRODUCTION THEREOF

CROSS REFERENCE TO PRIOR APPLICATIONS

This application is a divisional of application Ser. No. 13/119,964, filed on Mar. 21, 2011, which is a U.S. National Phase application under 35 U.S.C. §371 of International Application No. PCT/EP2009/060912, filed on Aug. 25, 2009 and which claims benefit to German Patent Application No. 10 2008 048 614.0, filed on Sep. 23, 2008. The International Application was published in German on Apr. 1, 2010 as WO 2010/034577 A1 under PCT Article 21(2).

FIELD

The present invention relates to valve metal and valve metal oxide agglomerate powders (valve metals are Nb, Ta, Ti, Zr, Hf, V, Mo, W, Al) and mixtures and alloys thereof, for example, of niobium and/or tantalum or niobium suboxide, for producing capacitors and sintered anode bodies for capacitors.

BACKGROUND

Solid electrolytic capacitors with a very large active capacitor area, which are therefore of a small design suitable for mobile communications electronics, are predominantly those with a niobium or tantalum pentoxide barrier layer applied to an appropriate conductive carrier, utilizing the stability of said barrier layer ("valve metal"), the comparatively high dielectric constants and the insulating pentoxide layer producible with a very homogeneous layer thickness by means of the electrochemical generation method. The carriers used are metallic or conductive lower oxidic (suboxide) precursors of the corresponding pentoxides. The carrier, which simultaneously constitutes a capacitor electrode (anode), consists of a highly porous, spongelike structure which is produced by sintering ultrafine primary structures or already spongelike secondary structures. The surface of the support structure is oxidized electrolytically ("formed") to the pentoxide, the thickness of the pentoxide layer being determined by the maximum voltage of the electrolytic oxidation ("forming voltage"). The counterelectrode is obtained by impregnating the spongelike structure with manganese nitrate, which is converted thermally to manganese dioxide, or with a liquid precursor of a polymer electrolyte or of a polymer dispersion of a conductive polymer and polymerizing, for example, PEDT. The electrical contacts to the electrodes are produced on one side by a tantalum or niobium wire incorporated by sintering in the course of generation of the carrier structure and, on the other side, by the metallic capacitor shell insulated from the wire.

The capacitance C of a capacitor is calculated by the following formula:

$$C = (F \cdot \epsilon)/(d \cdot V_F)$$

where F denotes the capacitor surface area, $\epsilon$ the dielectric constant, d the thickness of the insulator layer per volt of forming voltage and $V_F$ the forming voltage.

The sintering of ultrafine primary and/or secondary structures creates a very large active capacitor surface area, but also forms closed pores whose surface is inactive. The closed pores therefore reduce the volume-based capacitance of the capacitors produced from the powders. In the case of use of secondary structures without closed pores, owing to the higher volume-based capacitance, higher sintering temperatures can be used in the production of the anode bodies without loss of capacitance, which in turn leads to an enhancement of the sinter necks and to better wire connection compared to the use of conventional powders. Better wire attachment and thicker sinter necks results in a more stable anode body and a better leakage current, ESR and surge performance of the capacitor.

It is therefore desirable to minimize the number and the volume of closed pores in the capacitor.

One measure of the open pore level of a capacitor anode and of the secondary structures for use for capacitor production (agglomerate powder) is the skeletal density thereof, which is defined as the ratio of the mass of the sinter body to the sum of volume of the solids content and volume of the closed pores. The skeletal density of the anode structures is measured by means of mercury intrusion porosimetry, also known as mercury porosimetry. The customary sintering processes to obtain capacitor anodes achieve skeletal densities of 80 to 88% of the theoretical solid material density.

Processes for influencing the pore structure of capacitor anodes of niobium or tantalum to obtain broad or bimodal pore size distributions have already become known, in which so-called pore formers are used during the sintering step. EP 1291100 A1, WO 2006/057455 describe pore formers used which are organic substances which decompose or evaporate in the course of heating to the sintering temperature, or metals or metal oxides or metal hydrides removable from the sintered structure by acid leaching after the sintering step. DE 19855998 A1 describes gaseous pore formers, by means of which adhesively bound highly porous agglomerates are obtained, which essentially maintain their porosity in the course of sintering.

In these processes, the pore formers are used at relatively late process stages, in which sintered agglomerates with closed pores are already present, such that there is no effective prevention of the formation of closed pores.

When organic pore formers are used, the contamination of the capacitor anode body with carbon is moreover disadvantageous. When metals or metal compounds are used, in addition to possible contamination, a considerable level of effort is required to remove pore formers from the sintered structures.

SUMMARY

An aspect of the present invention is to provide capacitor agglomerate powders which enable the production of anode bodies with high skeletal density.

An alternative aspect of the present invention is to provide anodes for solid electrolytic capacitors which have a high skeletal density and hence a high volume efficiency (capacitance/volume, $CV/cm^3$).

A further alternative aspect of the present invention is to provide anode bodies which, after further processing to the capacitor, have an improved wire tensile strength, leakage current, ESR and/or surge performance.

In an embodiment, the present invention provides a refractory metal compound agglomerate powder having a product of a BET surface area in $m^2/g$ and a sliding coefficient of $\eta$ of 0.33 to 0.95, wherein the refractory metal compound agglomerate powder is selected from niobium agglomerate powder, niobium suboxide agglomerate powder, and tantalum agglomerate powder.

BRIEF DESCRIPTION OF THE DRAWINGS

The present invention is described in greater detail below on the basis of embodiments and of the drawings in which:

FIG. 1 shows a typical diagram of the dependence of density and compression pressure of a niobium suboxide sample.

DETAILED DESCRIPTION

The present invention provides valve metal and/or valve metal suboxide anode bodies, for example, niobium, tantalum and niobium suboxide anode bodies, such as niobium suboxide anode bodies of the formula $NbO_x$ where $0.7<x<1.3$, for example, where $0.8<x<1.1$, with a skeletal density of more than 88% of the theoretical density, for example, of more than 90%, or more than 92%, of the theoretical density. According to the present invention, skeletal densities of up to 94% and more of the theoretical density of the (compact) anode material are achievable. In the inventive anode bodies, the cumulated volume of the closed pores is less than 12%, for example, less than 10%, or, for example, less than 8%, of the volume of the (compact) anode material.

Valve metals in the context of the present invention are understood to mean the metals from the group of niobium, tantalum and titanium.

The inventive agglomerate powders can, for example, consist of sintered primary particles with a mean cross-sectional dimension determined from electron micrographs of 0.1 to 2 µm, and an agglomerate size according to ASTM B 822 ("Mastersizer", Daxad 11 wetting agent) of D10 from 3 to 50 µm, D50 from 20 to 200 µm and D90 from 30 to 400 µm. The agglomerate powder particles may have any desired forms, such as spheres, deformed spheres, fibres, chips, irregular morphology, etc., for example, spherical agglomerate powder particles, all forms described having a low volume of closed pores. The agglomerate powders have a good flowability (according to Hall, ASTM B 213) of less than 60 sec/25 g. The bulk density (according to Scott, ASTM B 329) in the case of niobium suboxide and niobium metal powders may advantageously be between 0.7 and 1.3 g/cm$^3$, and in the case of tantalum metal powders between 1.0 and 2.5 g/cm$^3$. The specific surface area ("BET", ASTM D 3663) may advantageously be between 0.5 and 20 m$^2$/g. The inventive agglomerate powders can, for example, have a porosity determined by mercury intrusion (open pores) of 50 to 70% by volume, more than 90% of the pore volume being formed by pores of diameter 0.1 to 5 µm.

The content of impurities, excluding conventional dopants such as nitrogen, phosphorus and/or vanadium, should be as low as possible. The powders can, for example, have contents of Fe, Cr, Ni, Cu, alkali metals of less than 20 ppm, and of fluoride and chloride of less than 50 ppm each. The carbon content can, for example, be less than 40 ppm. An advantageous nitrogen content can, for example, be 10 to 6000 ppm. Phosphorus contents in the inventive niobium suboxide powders are generally not detrimental. In niobium and tantalum metal powders, phosphorus of up to 500 ppm can be used to lower the sintering activity during the generation of the secondary structures and the anode structure. Optionally, before the sintering of the anode structure, the powder can be treated with phosphoric acid, ammonium hydrogenphosphate or ammonium phosphate. Further, but less critical impurities of Al, B, Ca, Mn and Ti are, for example, less than 10 ppm, with Si below 20 ppm.

In an embodiment of the present invention, the inventive agglomerate powder can, for example, have an increased densification coefficient α and an increased sliding coefficient η compared to prior art powders, which lead to better pressability of the powders. The product of BET surface area in m$^2$/g and sliding coefficient in the case of the inventive niobium suboxide powders can, for example, be 0.33 to 0.75, such as 0.45 to 0.58, in the case of the inventive tantalum powders 0.62 to 0.95, for example, 0.65 to 0.86, and in the case of the inventive niobium powders 0.38 to 0.8, for example, 0.42 to 0.6. The densification coefficient of the inventive agglomerate powders can, for example, be greater than 0.07 for niobium suboxide powder and greater than 0.08 for niobium and tantalum powder.

The present invention also provides niobium suboxide agglomerate powders from which, after pressing to a press density of 2.8 g/cm$^3$ and sintering at a temperature of ≥1340° C., for example, of greater than 1400° C., for 20 minutes, anode bodies are producible with a skeletal density of more than 88%, for example, more than 90%, or more than 92%.

The present invention further provides tantalum agglomerate powders from which, after pressing to a press density of greater than 5 g/cm$^3$ and sintering at a temperature of ≥1250° C. for 20 minutes, anode bodies are producible with a skeletal density of more than 88%, for example, more than 90%, or more than 92%.

The present invention also provides niobium agglomerate powders from which, after pressing to a press density of 3.14 g/cm$^3$ and sintering at a temperature of ≥1165° C., for example, ≥1180° C., for 20 minutes, anode bodies are producible with a skeletal density of more than 88%.

The present invention also provides a process for producing valve metal and/or valve metal suboxide agglomerate powders, which is characterized in that precursor particles of the agglomerate powders are mixed with a fine pore former, pore-rich, adhesively bounded agglomerates of the precursor particles are obtained by densifying the mixture and evaporating or decomposing the pore former, the adhesively bounded agglomerates are subjected to a thermal treatment at a temperature and for a duration sufficient for the formation of sinter bridges, and the at least partly sintered agglomerates are processed further in a manner known per se to valve metal and/or valve metal oxide agglomerate powders.

The mixture can be densified dry by compacting the mixture under pressure, or wet by slurrying the mixture, for example, in water, densifying the slurry by means of ultrasound, pouring off the supernatant liquid and drying.

In an embodiment of the present invention, tantalum, niobium and/or niobium suboxide agglomerates can be prepared having the formula $NbO_x$ where $0.7<x<1.3$, for example, $0.8<x<1.1$.

The precursor particles for use in accordance with the present invention can, for example, be primary particles, or secondary particles formed only from a few primary particles, of valve metals, such as niobium and/or tantalum, and/or oxides thereof, such as pentoxides of niobium and/or tantalum, with mean primary particle sizes less than 1 µm, for example, less than 0.5 µm, or less than 0.3 µm, in the direction of the smallest dimension. The particles may have any desired shape. The precursor particles can, for example, have a specific surface area of more than 80 m$^2$/g, such as more than 100 m$^2$/g.

The precursor particles used can, for example, be hydroxides or hydrated pentoxides, as obtained in the precipitation from aqueous niobium fluoride and/or tantalum fluoride solutions with ammonia, which still have a sufficient water content of 25 to 35% by weight and a specific surface area of more than 180 (in the case of Nb) or 100 m$^2$/g (in the case of Ta).

Pore formers can, for example, be ammonium salts such as halides, carbonates or oxalates. Examples include ammonium chloride and/or ammonium oxalate.

The pore formers can, for example, be used with a mean particle size of 0.5 to 20 μm, for example, 1.0 to 10 μm, or 1.5 to 5 μm, in an amount of 10 to 90% by volume, for example, 15 to 60% by volume, 20 to 50% by volume, or 30 to 45% by volume, based on the volume of the precursor particles.

In the case of wet densification, the precursor particles can, for example, be slurried with water. Other readily evaporable organic liquids with good wetting properties such as methanol, alcohols, ketones and/or esters and mixtures thereof with water are likewise suitable.

With the slurrying of the precursor particles, the fine pore former is mixed intensively. Subsequently, the mixture is densified by shaking, for example, by means of ultrasound. Any supernatant liquid is removed, so as to form a moist cake.

The moist cake consisting of a mixture of precursor particles and pore former particles is subsequently dried by gentle heating to a temperature of up to 150° C. in a transport gas stream, and the pore former is removed completely from the cake by slow further heating to 350 to 600° C.

Alternatively, the precursor particles comprising the fine pore former, after intensive dry mixing, can be densified at a pressure of 30 to 100 bar, and then the pore former can be removed correspondingly by heating.

The dry cake consisting of adhesively bound precursor particles is, optionally after crushing and sieving, heated to a temperature sufficient to form sinter bridges, so as to form a sintered open-pore precursor agglomerate powder with high pore volume, which is essentially free of closed pores.

The sintered precursor agglomerate powder is processed further in a manner known per se, as described below, to give the valve metal and/or valve metal suboxide agglomerate powder.

The present invention further provides a process for producing valve metal and/or valve metal oxide agglomerate powders, which is characterized in that precursor particles of the agglomerate powders are slurried in hydrogen peroxide or carbon dioxide-containing water, the water is removed by drying to release oxygen gas or carbon dioxide, so as to obtain pore-rich, adhesively bounded agglomerates of the precursor particles, the adhesively bounded agglomerates are subjected to a thermal treatment at a temperature and for a duration sufficient for the formation of sinter bridges, and the at least partly sintered agglomerates are processed further in a manner known per se to valve metal and/or valve metal oxide agglomerate powders During the drying of the slurry, water is withdrawn therefrom, while the hydrogen peroxide is decomposed to release oxygen gas or the solubility limit of the carbon dioxide in the remaining water is exceeded. The fine precursor particles in the slurry act as bubble nuclei for the gas released. As long as sufficient moisture is still present, the bubbles cannot escape from the slurry or agglomerate to large bubbles, so as to form an open-pore cake with large pore volume. The size of the pores formed by the bubbles and the pore volume of the cake can be controlled via the amount of initially dissolved carbon dioxide or hydrogen peroxide.

In the case of use of carbon dioxide as the pore former, the slurry can also be produced by dispersing the precursor particles in water under a carbon dioxide atmosphere or by stirring the hydroxides or hydrated pentoxides, as obtained in the precipitation from aqueous niobium fluoride and/or tantalum fluoride solutions with ammonia, which still have a sufficient water content of 25 to 35% by weight and a specific surface area of more than 100 m$^2$/g, under a carbon dioxide atmosphere, optionally under pressure.

To completely remove the water, the dry cake obtained is heated to a temperature of 100 to 500° C.

The dried cake consisting of adhesively bound precursor particles is, optionally after crushing and sieving, heated to a temperature sufficient to form sinter bridges, so as to form a sintered open-pore precursor agglomerate powder which is essentially free of closed pores.

If niobium and/or tantalum metal powder are used as precursor powders, the sintered precursor agglomerate powders obtained therefrom are deoxidized by mixing with magnesium turnings and heating in oxygen-free atmosphere or under high vacuum, and then milled to the desired agglomerate size.

Optionally, in a manner known per se, doping with nitrogen and/or phosphorus and/or vanadium can be effected by impregnating with solutions of nitrogen- and/or phosphorus- or vanadium-containing compounds before the deoxidation.

If pentoxides are used as precursor powders, they are reduced in a manner known per se according to WO 00/67936, in the case of niobium pentoxide, for example, by first by heating in a hydrogenous atmosphere to the dioxide, with gaseous magnesium to the metal and optionally doped.

To prepare NbO$_x$ powders with the abovementioned definition of x, the starting material is the abovementioned pentoxide precursor agglomerate powder. Optionally, after hydrogen reduction to the dioxide, said pentoxide precursor agglomerate powder is mixed intimately with a stoichiometric amount of correspondingly finely divided niobium metal powder and heated in a hydrogenous atmosphere, such that there is exchange of oxygen between the oxide and the metal. The finely divided niobium metal powder used can, for example, be a niobium metal precursor agglomerate powder obtained in accordance with the present invention.

In a further process, the pentoxide precursor agglomerate powders, optionally after hydrogen reduction together with the niobium metal powder, can again be mixed with pore formers, densified, removing the pore former, optionally sieved, and the adhesively bound powder mixture agglomerate heated in hydrogen atmosphere so that there is exchange of oxygen between the oxide and the metal.

The inventive niobium suboxide, niobium metal and tantalum metal powders are suitable for the production of solid electrolytic capacitors with specific capacitances of 20 000 to 300 000 μFV/g and very low residual leakage (also named as leakage currents) currents of less than 1 nA/μFV, for example, less than 0.2 nA/μFV, by customary processes.

To produce the anode bodies, the powder and a niobium or tantalum wire is placed into the mould and is pressed in the presence of binders and lubricants up to a pressed density of 2.3 to 3.5 g/cm$^3$ in the case of niobium or niobium suboxide powder or 4.5 to 7 g/cm$^3$ in the case of tantalum powder to give green bodies, the green bodies being obtained with very favourable compressive strength. The pressed bodies containing the contact wire can then, for example, be sintered in a niobium or tantalum boat at 1000 to 1500° C. for a sintering time of 10 to 25 minutes under high vacuum at 10$^{-8}$ bar. The sintering temperature and sintering time are, for example, selected such that the capacitor surface area which can be calculated later from the capacitance of the capacitor still has 65 to 45% of the specific surface area measured on the powder.

The present invention further provides capacitors comprising a valve metal and/or valve metal suboxide sintered capacitor anode body. The inventive capacitors can be used in different electrical devices.

EXAMPLES

Production of the Precursor Particles

V1: 75 l/h of aqueous $H_2NbF_7$ solution with a concentration of 81 g/l of Nb and 75 l/h of 9% aqueous $NH_3$ solution were added continuously to an initial charge of 100 l of deionized water over 15 hours, such that the pH was 7.6±0.4. The temperature of the solution was kept at 63° C. The resulting suspension was filtered through a pressure suction filter, and washed with 3% aqueous $NH_3$ solution and then with deionized water. The resulting moist niobium (V) hydroxide was dried at 100° C. in a drying cabinet for 24 hours. The resulting niobium (V) hydroxide had a specific surface area of 201 m²/g and spherical morphology.

V2: 40 parts by volume of deionized water were added with stirring to 100 parts by volume of niobium (V) ethoxide solution. The precipitated niobium (V) hydroxide (niobic acid) was filtered off by means of a suction filter and washed with deionized water. Subsequently, the niobium (V) hydroxide was dried at 100° C. for 17 hours. The powder had a specific surface area of 130 g/m² and irregular morphology.

V3: The precursor particles V1 were calcined under air at 500° C. for 4 hours and then milled in a jet mill to D90<10 µm (Mastersizer without ultrasound treatment). $Nb_2O_5$ with a specific surface area of 89 m²/g was obtained.

V4: 75 l/h of an aqueous $H_2TaF_7$ solution with a concentration of 155.7 g/l of Ta and 75 l/h of a 9% by weight aqueous $NH_3$ solution were conveyed continuously into an initial charge of 100 l of deionized water over 30 hours, in the course of which the pH was kept at 7.6±0.4 and the temperature of the solution was kept at 69° C. After removal by filtration, washing with 3% $NH_3$ solution and deionized water, and drying at 100° C. over 24 hours, tantalum (V) hydroxide with a specific surface area of 106 m²/g and spherical morphology was obtained.

V5: The precursor particles V4 were calcined under air at 500° C. for 2 hours and milled in a jet mill to D90<10 µm. A $Ta_2O_5$ powder with a specific surface area of 83 m²/g was obtained.

Preparation of Sintered Agglomerate Pentoxide Powders (P1-P14)

To prepare the sintered pentoxide powders P1 to P14, the precursors specified in Table 1 column 1 were used.

The precursors were mixed with the amount specified in Table 1 column 3 (% by weight based on the pentoxide) of a pore former specified in column 2 with a mean particle size of 1.5 µm either in aqueous suspension ("wet" in column 4) or dry ("dry" in column 4). In the case of wet mixing, the suspension of the settled solids mixtures was densified by means of ultrasound, supernatant water was poured off and drying was effected at 110° C. over 15 hours. In the case of dry mixing, the dry powder mixture was densified with a hydraulic laboratory press (die diameter 5 cm, fill height 3 cm) at 75 bar over 1 minute.

TABLE 1

| Pentoxide No. | 1 Precursor | 2 Pore former | 3 Amount % by wt. | 4 Amount % by wt. | 5 Densification | 6 Heat treatment ° C., h | 7 Sintering ° C., h |
|---|---|---|---|---|---|---|---|
| P1 | V1 | $(NH_4)_2(C_2O_4)$ | 30 | 22.8 | wet | 600, 3 | 1300, 5 |
| P2 | V1 | — | — | — | wet | 600, 3 | 1300, 5 |
| P3 | V2 | $(NH_4)_2(C_2O_4)$ | 30 | 23.5 | wet | 600, 3 | 1300, 5 |
| P4 | V2 | — | — | — | wet | 600, 3 | 1300, 5 |
| P5 | V2 | $(NH_4)_2(C_2O_4)$ | 40 | 28.9 | wet | 600, 3 | 1300, 5 |
| P6 | V2 | — | — | — | wet | 600, 3 | 1300, 5 |
| P7 | V3 | $NH_4Cl$ | 30 | 21.8 | dry | 600, 2 | 1150, 5 |
| P8 | V3 | — | — | — | dry | 600, 2 | 1150, 5 |
| P9 | V4 | $(NH_4)_2(C_2O_4)$ | 20 | 38.1 | wet | 600, 3 | 1600, 5 |
| P10 | V4 | — | — | — | wet | 600, 3 | 1600, 5 |
| P11 | V4 | $NH_4Cl$ | 20 | 36.8 | dry | 600, 2 | 1450, 5 |
| P12 | V4 | — | — | — | dry | 600, 2 | 1450, 5 |
| P13 | V5 | $NH_4Cl$ | 20 | 34.6 | dry | 600, 2 | 1600, 5 |
| P14 | V5 | — | — | — | dry | 600, 2 | 1600, 5 |

The dried (adhesively bound agglomerates) or pressed (pressings) powder mixtures were subsequently, in order to decompose the pore former, heated to the temperature specified in column 5 of Table 1 for the time which is likewise specified there. This was followed by sintering at the temperature and for the duration specified in column 6 under air.

The sintered agglomerates were crushed with a jaw crusher, milled a ball mill and sieved to <300 µm.

Preparation of Metal Powders (M1 to M14)

The pentoxide powders P1 to P14 were converted to metal powders M1 to M14, in the case of niobium pentoxide after reduction to niobium dioxide by means of hydrogen at 1300° C., by reduction with magnesium vapour at 900° C. under argon (as the transport gas) over 6 hours, cooling, passivating, sieving below 300 µm, removing the magnesium oxide by means of 8% sulphuric acid and washing to neutrality with deionized water. Table 2 reports the BET surface areas, the D50 values according to Mastersizer (without ultrasound treatment) and the sums of the impurity contents of iron, chromium and nickel, of fluorine and chlorine, and of sodium and potassium.

TABLE 2

| Powder | M1 | M2 | M3 | M4 | M5 | M6 | M7 | M8 | M9 | M10 | M11 | M12 | M13 | M14 |
|---|---|---|---|---|---|---|---|---|---|---|---|---|---|---|
| BET, m²/g | 6.5 | 6.7 | 5.7 | 5.6 | 5.5 | 5.4 | 8.1 | 7.8 | 4.8 | 4.4 | 6.2 | 5.9 | 5.3 | 5.4 |
| Fe + Cr + Ni, ppm | 8 | 9 | 5 | 8 | 10 | 11 | 8 | 6 | 9 | 7 | 10 | 5 | 4 | 7 |
| F + Cl, ppm | <5 | 6 | <5 | 6 | 5 | <5 | 9 | <5 | <5 | <5 | 9 | <5 | 8 | <5 |
| Na + K, ppm | <3 | <3 | <3 | 4 | <3 | <3 | <3 | <3 | <3 | 3 | <3 | <3 | <3 | <3 |
| D50, μm | 41 | 39 | 162 | 159 | 169 | 172 | 123 | 110 | 37 | 32 | 68 | 73 | 143 | 154 |

Preparation of Niobium Suboxide Powders (S1 to S10)

To prepare the niobium suboxide powders, in each case, the niobium pentoxide specified in column 1 of Table 3 was mixed dry with 3 times the stoichiometric amount of the niobium metal specified in column 2 of Table 3 and the pore former specified in column 3 (20% by weight based on metal and pentoxide), densified at 75 bar and heat treated at 600° C. over 3 hours to remove the pore former.

The dry cake was then heated to the reaction temperature specified in Table 3 in a hydrogen atmosphere for 4 hours, cooled, passivated and sieved to <300 μm. Table 6 reports the BET surface areas, the D50 values according to Mastersizer (without ultrasound treatment) and the sums of the impurity contents of iron, chromium and nickel, of fluorine and chlorine, and of sodium and potassium. Additionally reported are the densification coefficient α and the sliding coefficient η, as defined below, and the products of sliding coefficient η and the BET surface area.

TABLE 3

| | Column | | | |
|---|---|---|---|---|
| Suboxide | 1 Pentoxide | 2 Metal | 3 Pore former | 4 Reaction temperature ° C. |
| S1 | P3 | M3 | NH₄Cl | 1050 |
| S2 | P3 | M3 | NH₄Cl | 1250 |
| S3 | P3 | M3 | NH₄Cl | 1400 |
| S4 | P3 | M3 | NH₄Cl | 1500 |
| S5 | P3 | M3 | — | 1400 |
| S6 | P4 | M4 | NH₄Cl | 1400 |
| S7 | P4 | M4 | — | 1400 |
| S8 | P3 | M2 | NH₄Cl | 1400 |

TABLE 3-continued

| | Column | | | |
|---|---|---|---|---|
| Suboxide | 1 Pentoxide | 2 Metal | 3 Pore former | 4 Reaction temperature ° C. |
| S9 | P1 | M1 | NH₄Cl | 1400 |
| S10 | P2 | M2 | — | 1400 |

Preparation of Deoxidized Metal Agglomerate Powders (D1 to D14).

For deoxidation, powders M1 to M8 and M10 to M14 were each mixed with 8% by weight (niobium metal powder) or 5% by weight (tantalum metal powder) of magnesium turnings and an amount of an NH₄H₂PO₄ solution sufficient for doping with 100 ppm of phosphorus, and heated to 850° C. for 2 hours under argon, cooled and passivated, and sieved to <300 μm. Two samples of powder M9 were deoxidized at temperatures of 850 and 750° C. and are referred to hereinafter as M9a and M9b. Tables 4 and 5 report the BET surface areas, the D50 values according to Mastersizer (without ultrasound treatment) and the sums of the impurity contents of iron, chromium and nickel, of fluorine and chlorine, and of sodium and potassium. Additionally reported are the densification coefficient α and the sliding coefficient η, as defined below, and the products of sliding coefficient η and the BET surface area.

Production of Anode Bodies

The deoxidized metal powders D1 to D14 and niobium suboxide powders S1 to S8 and a tantalum wire of thickness 0.3 mm were placed into the press mould of diameter 3.6 mm and a length of 3.6 mm and pressed to a density in g/cm³ specified in Tables 4, 5 and 6, and were then sintered under high vacuum for 20 minutes at the temperature in ° C. specified in the tables.

TABLE 4

| Example | 1 | 2 | 3 | 4 | 5 | 6 | 7 | 8 | 9 | 10 |
|---|---|---|---|---|---|---|---|---|---|---|
| Deoxidized niobium metal powder | D1 | D2 | D3 | | D4 | D5 | D6 | D7 | D8 | |
| Precursor powder | M1 | M2 | M3 | | M4 | M5 | M6 | M7 | M8 | |
| Fe + Cr + Ni, ppm | 7 | 7 | 4 | | 9 | 9 | 12 | 7 | 7 | |
| F + Cl, ppm | <5 | <5 | 5 | | <5 | <5 | <5 | 9 | <5 | |
| Na + K, ppm | <3 | <3 | <3 | | 3 | <3 | <3 | <3 | <3 | |
| D50, μm | 47 | 43 | 179 | | 163 | 172 | 181 | 109 | 122 | |
| D90, μm | 71 | 75 | 280 | | 299 | 281 | 301 | 245 | 251 | |
| Densification coefficient α | 0.09 | 0.05 | 0.09 | | 0.06 | 0.11 | 0.04 | 0.11 | 0.05 | |
| Sliding coefficient η | 0.33 | 0.19 | 0.39 | | 0.28 | 0.41 | 0.25 | 0.11 | 0.08 | |
| BET, m²/g | 1.65 | 1.71 | 1.15 | | 1.09 | 1.11 | 1.08 | 4.8 | 4.40 | |
| η × BET | 0.54 | 0.32 | 0.45 | | 0.31 | 0.46 | 0.27 | 0.53 | 0.35 | |

TABLE 4-continued

| Example | 1 | 2 | 3 | 4 | 5 | 6 | 7 | 8 | 9 | 10 |
|---|---|---|---|---|---|---|---|---|---|---|
| Anodes: | | | | | | | | | | |
| Press density, g/cm³ | 3.14 | 3.14 | 3.14 | 3.14 | 3.14 | 3.14 | 3.14 | 3.14 | 3.14 | 3.14 |
| Sinter temp., °C. | 1165 | 1165 | 1165 | 1200 | 1165 | 1200 | 1165 | 1165 | 1165 | 1165 |
| Skeletal density, % | 91 | 87 | 92 | 91 | 87 | 86 | 93 | 87 | 93 | 87 |

TABLE 5

| Example | 11 | 12 | 13 | 14 | 15 | 16 | 17 | 18 | 19 | 20 |
|---|---|---|---|---|---|---|---|---|---|---|
| Deoxidized Ta metal powder | D9a | D9b | D10 | | D11 | | D12 | | D13 | D14 |
| Precursor Ta powder | M9a | M9b | M10 | | M11 | | M12 | | M13 | M14 |
| Fe + Cr + Ni, ppm | 9 | 9 | 6 | | 9 | | 7 | | 5 | 8 |
| F + Cl, ppm | <5 | <5 | <5 | | 8 | | <5 | | 7 | <5 |
| Na + K, ppm | <3 | <3 | <3 | | <3 | | <3 | | <3 | <3 |
| D50, μm | 36 | 35 | 33 | | 73 | | 67 | | 162 | 159 |
| D90, μm | 63 | 58 | 55 | | 152 | | 159 | | 258 | 241 |
| Densification coefficient α | 0.10 | 0.09 | 0.06 | | 0.09 | | 0.06 | | 0.09 | 0.05 |
| Sliding coefficient η | 0.31 | 0.17 | 0.24 | | 0.26 | | 0.19 | | 0.29 | 0.2 |
| BET, m²/g | 2.52 | 4.11 | 2.47 | | 3.1 | | 3.07 | | 2.91 | 2.84 |
| η × BET | 0.78 | 0.70 | 0.59 | | 0.81 | | 0.58 | | 0.84 | 0.57 |
| Anodes: | | | | | | | | | | |
| Press density, g/cm³ | 5.0 | 5.0 | 5.0 | 5.75 | 5.0 | 5.75 | 5.0 | 5.0 | 5.75 | 5.75 |
| Sinter temp., °C. | 1250 | 1250 | 1250 | 1250 | 1250 | 1250 | 1250 | 1250 | 1250 | 1250 |
| Skeletal density, % | 92 | 91 | 85 | 82 | 93 | 92 | 84 | 82 | 92 | 85 |

TABLE 6

| Example | 21 | 22 | 23 | 24 | 25 | 26 | 27 | 28 | 29 | 30 | 31 | 32 | 33 | 34 |
|---|---|---|---|---|---|---|---|---|---|---|---|---|---|---|
| Suboxide powder | S1 | S2 | S3 | S3 | S4 | S5 | S5 | S6 | S6 | S7 | S7 | S8 | S9 | S10 |
| Fe + Cr + Ni, ppm | 6 | 7 | 7 | 6 | <5 | | <5 | | <5 | | 7 | 6 | <5 | |
| F + Cl, ppm | 6 | <5 | 7 | 6 | <5 | | <5 | | <5 | | 7 | 6 | <5 | |
| Na + K, ppm | <3 | 3 | <3 | <3 | <3 | | 3 | | <3 | | <3 | <3 | <3 | |
| D50, μm | 151 | 168 | 181 | 195 | 171 | | 189 | | 178 | | 101 | 59 | 51 | |
| D90, μm | 261 | 273 | 269 | 298 | 281 | | 279 | | 271 | | 210 | 94 | 82 | |
| Densification coefficient α | 0.12 | 0.12 | 0.13 | 0.12 | 0.11 | | 0.09 | | 0.06 | | 0.09 | 0.09 | 0.05 | |
| Sliding coefficient η | 0.2 | 0.27 | 0.29 | 0.4 | 0.25 | | 0.23 | | 0.16 | | 0.25 | 0.28 | 0.15 | |
| BET m²/g | 2.5 | 2 | 1.8 | 1.3 | | | | | 1.84 | | | | 1.75 | |
| η × BET | 0.50 | 0.54 | 0.52 | 0.52 | | | | | 0.29 | | | | 0.26 | |
| Anodes: | | | | | | | | | | | | | | |
| Press density, g/cm³ | 2.8 | 2.8 | 2.8 | 2.8 | 2.8 | 2.8 | 2.8 | 2.8 | 2.8 | 2.8 | 2.8 | 2.8 | 2.8 | 2.8 |
| Sinter temp., °C. | 1340 | 1340 | 1340 | 1460 | 1340 | 1340 | 1460 | 1340 | 1460 | 1340 | 1460 | 1340 | 1340 | 1340 |
| Skeletal density, % | 96 | 94 | 94 | 93 | 94 | 93 | 91 | 90 | 89 | 87 | 86 | 92 | 94 | 85 |

The densification coefficient α (compactibility α) and the sliding coefficient η were determined in a powder testing centre model PTC-03DT from KZK Powder Tech Corp., Chantilly, Va., USA.

The densification coefficient was determined by introducing powders (without binder or lubricant) into a die of diameter D=12.7 mm, and pressing with a plunger to a height of H12.694 mm, the pressure $p_c$ on the plunger being measured during the pressing. A typical diagram which shows the dependence of density and compression pressure of a niobium suboxide sample is reproduced in FIG. 1.

The densification coefficient α is determined by the following equation:

$$\|\log|\log \rho_{ra}\| = \alpha \log((p_r + p_0)/p_0) + \|\log|\log \rho_{rp}\|,$$

where $\rho_{rp}$ is the tap density of the powder, $\rho_{ra}$ is the mean density of the pressed body after compression under the pressure $p_r$, and $p_0$ is the gravitational pressure on the powder (weight of the powder divided by the cross-sectional area of the die).

To determine the sliding coefficient, the pressure $p_d$ at the bottom of the die was additionally measured on attainment of a pressed density of 4.8 g/cm³ in the case of tantalum, 3.14 g/cm³ in the case of niobium and 2.8 g/cm³ in the case of niobium suboxide. The sliding coefficient η was determined by the following equation:

$$p_d/p_c = \eta^{SH/4F}$$

where S is the cross-sectional circumference πD and F is the cross-sectional area πD²/4.

The present invention is not limited to embodiments described herein; reference should be had to the appended claims.

What is claimed is:

1. A refractory metal compound agglomerate powder having a product of a BET surface area in m²/g and a sliding coefficient of η of 0.33 to 0.95, wherein the refractory metal compound agglomerate powder is selected from niobium agglomerate powder, niobium suboxide agglomerate powder, and tantalum agglomerate powder.

2. The refractory metal compound agglomerate powder as recited in claim 1, wherein the refractory metal compound agglomerate powder is a niobium suboxide agglomerate powder, and the product of the BET surface area in m²/g and the sliding coefficient of η of the niobium suboxide agglomerate powder is 0.33 to 0.75.

3. The refractory metal compound agglomerate powder as recited in claim 1, wherein the refractory metal compound agglomerate powder is a tantalum agglomerate powder, and the product of the BET surface area in m²/g and the sliding coefficient η of the tantalum agglomerate powder is 0.62 to 0.95.

4. The refractory metal compound agglomerate powder as recited in claim 1, wherein the refractory metal compound agglomerate powder is a niobium agglomerate powder, and the product of the BET surface area in m²/g and the sliding coefficient η of the niobium agglomerate powder 0.38 to 0.8.

5. A method of using the niobium suboxide agglomerate powder as recited in claim 2 to produce an anode body with a particle density of >88%, the method comprising:
providing the niobium suboxide agglomerate powder as recited in claim 2;
pressing the niobium suboxide agglomerate powder to a press density of 2.8 g/cm³; and
sintering the niobium suboxide agglomerate powder to a temperature of ≥1340° C. so as to provide the anode body.

6. A method of using the tantalum agglomerate powder as recited in claim 3 to produce an anode body with a particle density of >88%, the method comprising:
providing the tantalum agglomerate powder as recited in claim 3;
pressing the tantalum agglomerate powder to a press density of 5.0 g/cm³; and
sintering the tantalum agglomerate powder to a temperature of >1250° C. so as to provide the anode body.

7. A method of using the niobium agglomerate powder as recited in claim 4 to produce an anode body with a particle density of >88%, the method comprising:
providing the niobium agglomerate powder as recited in claim 4;
pressing the niobium agglomerate powder to a press density of 3.14 g/cm³; and
sintering the niobium agglomerate powder to a temperature of ≥1165° C. so as to provide the anode body.

8. A refractory metal compound agglomerate powder, the refractory metal compound agglomerate powder having a densification coefficient >0.07, wherein the refractory metal compound agglomerate powder is selected from niobium agglomerate powder, niobium suboxide agglomerate powder, and tantalum agglomerate powder.

9. The refractory metal compound agglomerate powder as recited in claim 8, wherein the refractory metal compound agglomerate powder is a niobium suboxide agglomerate powder.

10. The refractory metal compound agglomerate powder as recited in claim 8, wherein the refractory metal compound agglomerate powder is a niobium agglomerate powder, and the densification coefficient of the niobium agglomerate powder is >0.08.

11. The refractory metal compound agglomerate powder as recited in claim 8, wherein the refractory metal compound agglomerate powder is a tantalum agglomerate powder, and the densification coefficient of the tantalum agglomerate powder is >0.08.

12. A method for producing at least one of a valve metal agglomerate powder and a valve metal suboxide agglomerate powder for producing a sintered capacitor anode body, the method comprising:
mixing precursor particles of the at least one of a valve metal agglomerate powder and a valve metal oxide agglomerate powder with fine pore formers to obtain a mixture;
compacting the mixture and thermally removing the pore formers so as to provide pore-rich, adhesively bound agglomerates of the precursor particles;
thermally-treating the pore-rich, adhesively bound agglomerates of the precursor particles at a temperature and for a duration to form sinter bridges so as to provide at least partially sintered adhesively bound agglomerates of the precursor particles; and
further processing the at least partially sintered adhesively bound agglomerates of the precursor particles so as to provide the at least one of a valve metal agglomerate powder and a valve metal suboxide agglomerate powder.

13. The method as recited in claim 12, wherein,
the mixing of the precursor particles of the at least one of a valve metal agglomerate powder and a valve metal oxide agglomerate powder with fine pore formers to obtain a mixture is performed by slurrying the precursor particles of the at least one of a valve metal agglomerate powder and a valve metal oxide agglomerate powder with hydrogen peroxide-containing water or with carbon dioxide-containing water; and
the compacting of the mixture and the thermally removing of the pore formers so as to provide pore-rich, adhesively bound agglomerates of the precursor particles is performed by removing water via drying so as to release oxygen gas or carbon dioxide gas.

14. The method as recited in claim 13, wherein the precursor particles have a specific surface area of >80 m2/g.

15. The method as recited in claim 12, wherein the precursor particles have a specific surface area of >80 m²/g.

16. The method as recited in claim 12, wherein the fine pore formers are ammonium salts with an evaporation, a sublimation, or a decomposition temperature of <600° C.

17. The method as recited in claim 16, wherein the fine pore former is at least one of a finely divided ammonium chloride and an ammonium oxalate.

18. The method as recited in claim 12, wherein the fine pore former is used in an amount of 10 to 90% by volume based on the volume of the precursor particles.

* * * * *